(12) United States Patent
Veeraraghavan et al.

(10) Patent No.: US 8,229,242 B2
(45) Date of Patent: Jul. 24, 2012

(54) METHOD FOR RECONSTRUCTING SURFACES OF SPECULAR OBJECT FROM SPARSE REFLECTION CORRESPONDENCES

(75) Inventors: Ashok Veeraraghavan, North Cambridge, MA (US); Oncel C. Tuzel, Cambridge, MA (US); Aswin Sankaranarayanan, Houston, TX (US); Amit K Agrawal, Somerville, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 328 days.

(21) Appl. No.: 12/731,333

(22) Filed: Mar. 25, 2010

(65) Prior Publication Data

US 2011/0235933 A1    Sep. 29, 2011

(51) Int. Cl.
*G06K 9/40* (2006.01)
*G01B 11/30* (2006.01)

(52) U.S. Cl. ........................ 382/254; 356/612

(58) Field of Classification Search .............. 382/103, 382/254, 266; 345/426; 256/612; 358/3.27, 358/447; 707/999.002
See application file for complete search history.

(56) References Cited

U.S. PATENT DOCUMENTS

| 7,646,887 | B2 * | 1/2010 | Goncalves et al. | 382/103 |
| 8,085,987 | B2 * | 12/2011 | Shalaby et al. | 382/108 |
| 2008/0313140 | A1 | 12/2008 | Pereira | |

* cited by examiner

*Primary Examiner* — Abolfazl Tabatabai
(74) *Attorney, Agent, or Firm* — Dirk Brinkman; Gene Vinokur

(57) ABSTRACT

A point correspondence procedure is applied to a set of images of a specular object to produce sparse reflection correspondences. The set of images is subject to rotation while acquired by a camera. That is, either the camera, the environment or the object rotates. Either a linear system AΘ=0 is solved or a related second order cone program (SOCP) is solved, where Θ is a vector of local surface parameters. Gradients of the surface are obtained from the local quadric surface parameters, and the gradients are integrated to obtain normals, wherein the normals define a shape of the surface.

19 Claims, 2 Drawing Sheets

200

METHOD FOR RECONSTRUCTING SURFACES OF SPECULAR OBJECT FROM SPARSE REFLECTION CORRESPONDENCES

FIELD OF THE INVENTION

This invention relates generally to computer vision, and more particularly to reconstructing specular surfaces from sparse reflection correspondences.

BACKGROUND OF THE INVENTION

Specular objects that exhibit mirror-like reflectance have no appearance of their own, but rather distort a surrounding environment. Traditional surface recovery methods designed for Lambertian surfaces, such as structure from motion (SfM), stereo or multi-view stereo, can not be used directly for specular objects.

Shape from specular flow (SFSF) explores surface estimation by measuring dense optical flow of environment features as observed on a mirror under a known motion of environment, mirror, or camera. Much of the prior art work in SFSF assumes infinitesimal rotation of the environment, where in the forward flow equations linking the motion field, surface parameters and specular flow (SF) can be expressed as a partial differential equation (PDE).

However, conventional approaches do not extend to finite or large motion because large displacements cannot be incorporated into the PDE framework. Further, SFSF requires a dense optical flow, which is difficult to obtain for specular objects because SF exhibits certain undesirable properties, such as undefined or infinite flow, and one-to-many mappings.

Specular Flow verses Reflection Correspondences

FIG. 1 shows point P1 on surface S1, and point P2 on surface S2. The normals n, and curvatures of the surfaces at the two points are identical. Because the specular flow forward equations depend only on local normal and curvature, for the same infinitesimal environment motion, the flow will be identical for these two points.

However, in case of a finite or large environment rotation θ as shown, the observed flow depends not only on the local normal and curvature, but also on properties of the neighborhood. Notice that the actual flow observed at these two surface points is radically different because of the difference in their neighborhoods.

This dependence is not easily incorporated into the specular flow framework.

Qualitative Properties:

It has been shown show that local surface properties, such as concave or convexity, can be determined under motion of the observer without knowledge of the lighting. Stereoscopic images of specular highlights can be analyzed to shows that the disparity of highlights is related to its convexity or concavity.

Active Illumination

The structure of specular objects can be estimated using photometric stereo images. Caustics can be bused to determine if an image feature is real or a reflection. Then, surface recovery can be performed by tracking an unknown scene point. This property can then be used to estimate surface mesostructures at high resolution. Probes of a known surface and reflectance can determine the properties of an unknown surface.

Calibrated Environment

Surface reconstruction under known environment is well known. Local properties of a smooth surface can be determined up to third order by the observed projection of two calibrated lines. Multiple images of a calibrated pattern can be used to reconstruct the shape of the surface mirror. Structured highlighting can also be used to obtain the shape of specular objects.

Uncalibrated Environments

Specular flow can be significantly different from the motion field, especially near points of parabolic curvature. Specular path perturbation can be used for fast rendering of multiple inter-reflections.

Specular flow can also be determined for two known or three unknown rotations about arbitrary axes. Both of these approaches require a significant number of initial conditions (in terms of normals) to solve for the shape of the surface. Under a different parameterization of the surface, the estimation problem becomes linear. This is used to estimate the shape of the mirror from multiple specular flows without any additional information.

However, the SFSF formulation is inherently differential and does not extend to large motion.

SUMMARY OF THE INVENTION

The embodiments of the invention provide a method for reconstructing surfaces of specular objects using sparse reflection correspondences (RC). Assuming a finite object and/or environment motion with a fixed camera and un-calibrated environment, or a coupled motion of the camera and the object, the method derives a relationship between the RC and the surface shape.

By locally modeling the surface as a quadric equation, the relationship between the reflection correspondences and unknown surface parameters becomes linear. The surface reconstruction method solves either an eigenvalue problem, or a second order cone program (SOCP).

We belief this is the first method to reconstruct specular surfaces from sparse reflection correspondences. In the preferred embodiment the reflection correspondences are obtained by a scale-invariant feature transform (SIFT). However, other image point correspondence procedures, such as optical flow, normalized correlation, Speeded Up Robust Features (SURF), etc. can also be utilized.

Our method overcomes practical issues in shape from specular flow (SFSF), such as the requirement of dense optical flow and undefined/infinite flow at parabolic points. Notice that the method is still applicable when dense sets of correspondences are available.

DETAILED DESCRIPTION OF THE PREFERRED EMBODIMENTS

Figure 1:
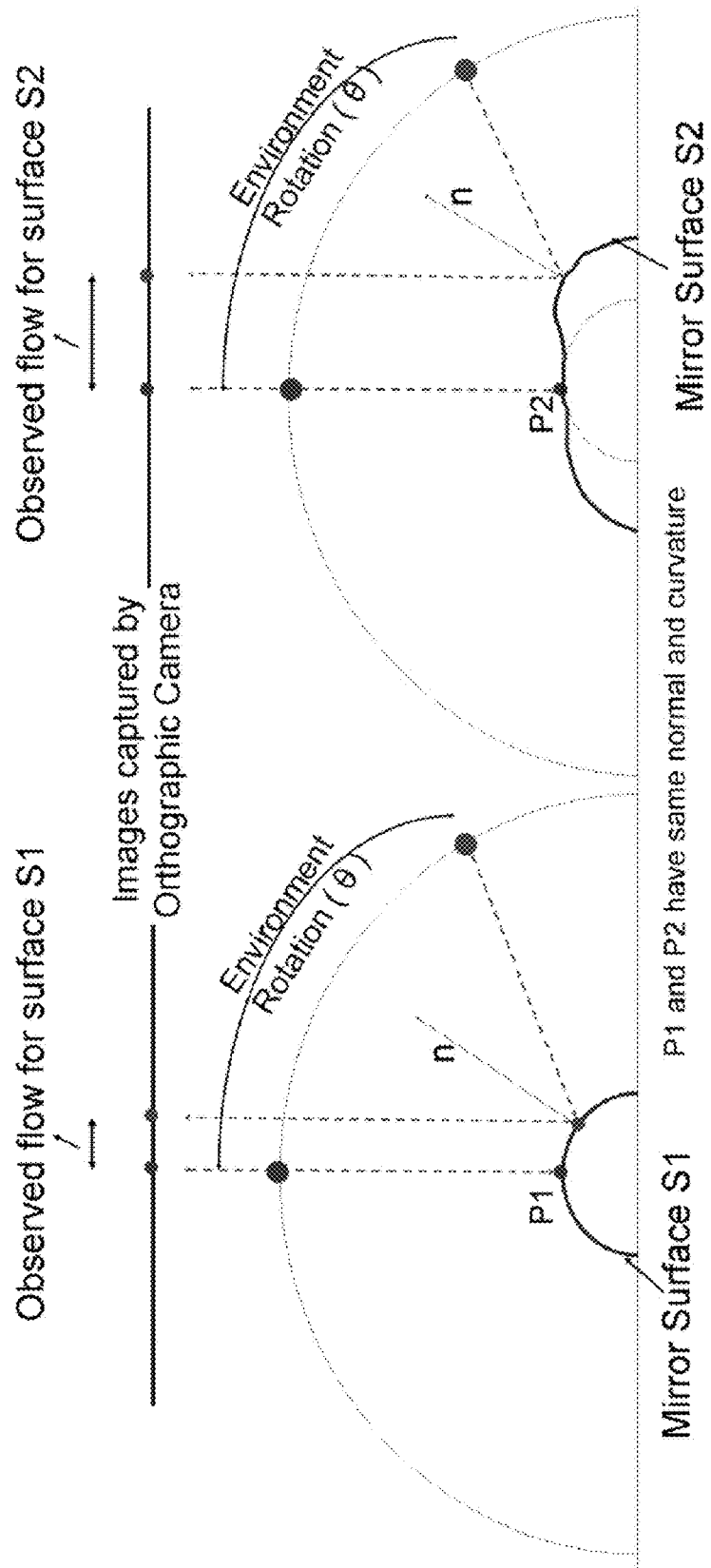
FIG. 1 is a schematic of an effect of finite motion on points observed on a specular object.
Figure 2:
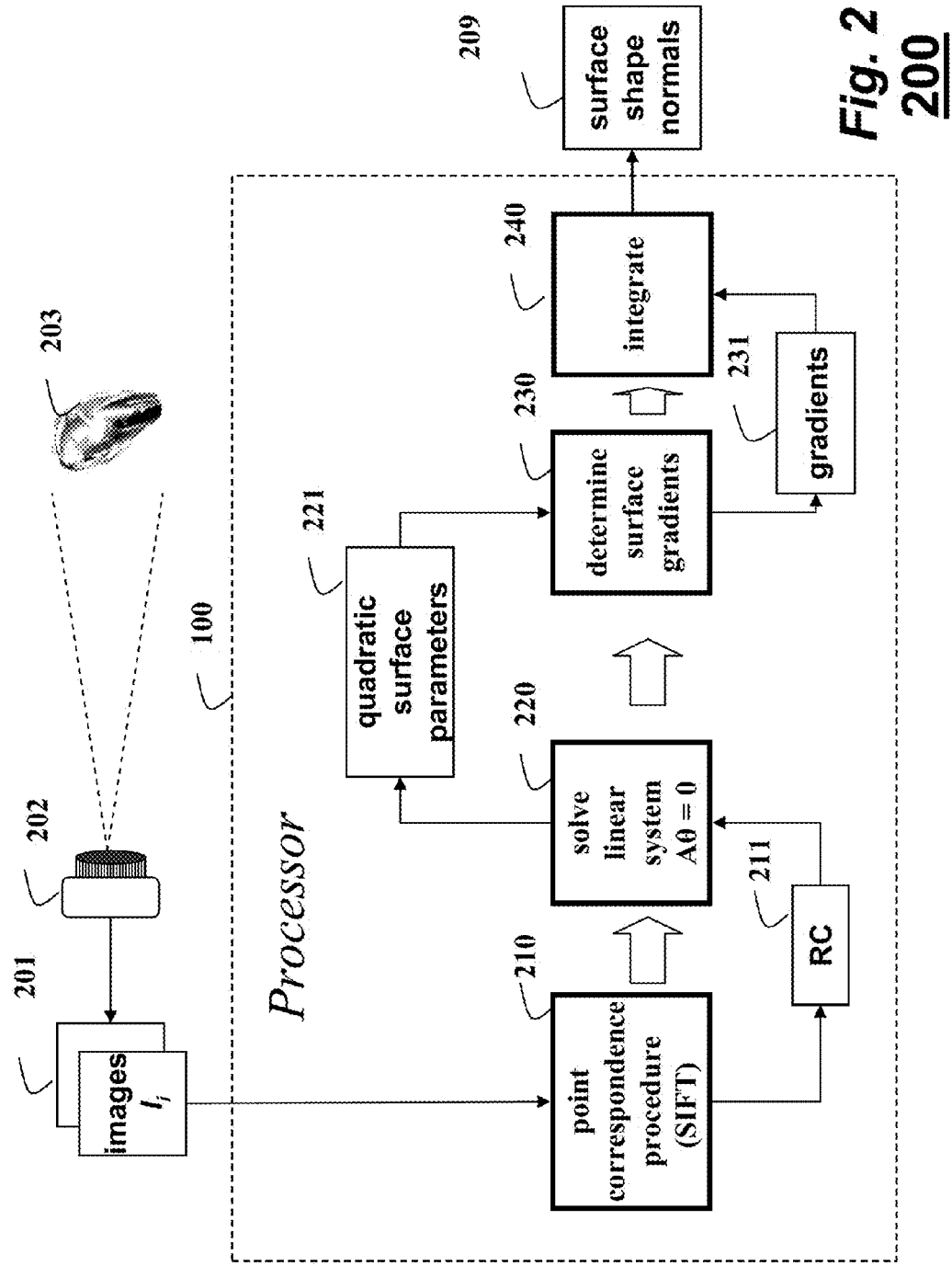
FIG. 2 is a block diagram of a method for reconstructing a surface of a specular object using sparse reflection correspondences according to embodiments of the invention.

As shown in FIG. 2, the embodiments of our invention provide a method 200 for reconstructing a surface 209 of smooth mirror-like object 203 using sparse reflection correspondences (RC). The steps of the method can be performed in a processor 100 including memory and input/output interfaces as known in the art.

As defined herein, sparse means that the number of correspondences is about two orders of magnitude less than a number of available dense correspondences.

For example, in a 640×480 image, i.e., there are about N=30,000 pixels. A conventional method would require approximately 30,000 correspondences. Our sparse method can solve the problem with about 300-500 correspondences.

We acquire a set of images 201 of the object with a camera 202, subject to rotation. The rotation can be for the object, the camera, or the environment.

In a preferred embodiment, we apply a scale-invariant feature transform (SIFT—U.S. Pat. No. 7,646,887) procedure 210 to produce reflection correspondences 211. However, other image point correspondence procedures, such as optical flow, normalized correlation, Speeded Up Robust Features (SURF—U.S. Publication 2008-0313140), can also be utilized.

We use the correspondences to solve 220 a linear system of quadratic equations $A\Theta=0$, where $\Theta$ is a vector of quadric surface parameters $\{J_i, H_i, i=1, \ldots, N\}$ 221, as described below.

The solution to the linear system is used to determine surface gradients 231. The gradients are integrated 240 to output the surface normals 209, which define the shape of the object.

Reflection Correspondences

For simplicity, we first describe the method as applicable to an orthographic camera. The method is equally applicable for a calibrated perspective camera.

We assume that the environment is at infinity, which ensures that the environment feature imaged at a pixel is dependent only on the normal of the surface element observed at the pixel and not on the location of the pixel.

Let $I(x)$ be the intensity observed at pixel x, and $E(\Theta)$ be an environment intensity map parameterized by Euler angles $\Theta=(\theta, \phi)$. We model the surface in the well known Monge form $z=f(x)=f(x, y)$. The forward imaging equation is $$I(x) = E(\theta(x)) = E(\theta(x), \phi(x)) \quad (1)$$
$$\tan \theta(x) = \frac{2\|\nabla f\|}{1 - \|\nabla f\|^2}$$
$$\tan \phi(x) = \frac{f_y(x)}{f_x(x)}$$

and $\nabla f(x)=(f_x(x),f_y(x))^T$ are the surface gradients at pixel x. Herein, we model the surface in terms of its gradient field $\nabla f(x)$. Our goal is to estimate the shape $f(x)$ from multiple images of the object under known motion of the camera, object, or environment.

Influence of Motion on Observed Features

For an orthographic camera, translation of the surface does not change the surface normals in a camera coordinate system, and produces just a translation of the image. Thus, it does not provide any new information. Similarly, translation of the object gives no additional information because the environment is assumed to be at infinity. Rotation of the camera about the optical axis (in-plane rotation) is a remapping of pixels and produces no new information. For the same reason, rotation of the camera about the principal axis is a remapping of the pixels and produces no new information. A rotation of environment is equivalent to placing the object on the camera's optical axis and rotating the camera-object pair in tandem.

Thus, ignoring pixel remapping, environment rotation is equivalent to object rotation about the optical axis of the camera. Herein, we only consider object rotation because this changes the normal field observed by the camera, thereby producing images not seen earlier, although the method is easily extended to the other rotations.

Due to assumption of environment at infinity, observed environment features depend only on the surface normal of the object. Under object rotation, its image changes in a structured way. The environment feature observed at a pixel could reappear at locations where the surface normal reappears. It is also possible that the environment feature does not reappear after object rotation, or reappear at multiple locations. We now derive the relationship between the reflection correspondences (RC) and surface shape.

Infinitesimal Rotation

For completeness, we first describe that reflection correspondences are equivalent to specular flow under infinitesimal object rotation. The surface is $z=f(x)$ in the camera coordinate system at $t=0$. After rotation about the camera principal axis, the mirror surface at time t is $f(t, x)=f(R(t)^T x)$. The 2×2 rotation matrix is $R(t)=\exp(\omega t)$. The surface gradients are $$\nabla f(t,x)=R(t)\nabla f(R(t)^T x). \quad (2)$$

Consider an environment feature that moves along $x(t)= x_0+\upsilon(t)$ as the object rotates. Under these modeling assumptions, $$\nabla f(t,x_0+\upsilon(t))=\nabla f(0,x_0)=\nabla f(x_0).$$

This implies that $$\frac{d\nabla f(t, x(t))}{dt} = 0 \quad (3)$$

Evaluating this expression at $t=0$, we obtain $$\omega \nabla f(x_0) - \left[\frac{\partial^2 f}{\partial x^2}\right](\omega x_0 - \dot{\upsilon}(x_0)) = 0 \quad (4)$$

This gives the forward flow equations relating the infinitesimal specular flow $\upsilon$ to the local surface parameters, and the known rotation $\omega$. Given the specular flow, the surface gradient field can be recovered by solving the partial differential equation defined in Equation (4).

The second order properties of the surface encoded in a Hessian matrix $[\partial^2 f/\partial x^2]$ play an important role in determining the specular flow. When this matrix is singular, the specular flow goes to infinity. Parabolic curvature points have a singular Hessian matrix, and exhibit infinite flow.

Infinitesimal to Finite Rotation

While infinitesimal motion leads to an elegant theoretical formulation, in practice it is approximated by a small motion. For Lambertian objects, small motion is often a good approximation to infinitesimal motion, as the flow values are well-defined. However, the presence of infinite flow at parabolic curvature points indicates that no matter how small the motion is, the specular correspondences will be undefined in the patch of parabolic curvature points. A patch is a region of adjacent pixels. The size of this patch depends on the magnitude of the rotation. Hence, it becomes hard to estimate the dense specular flow field.

This observation motivates us to model matches between images in terms of sparse reflection correspondences as opposed to a dense flow field. Sparse correspondence allows us to incorporate pixels that have no associated flow, as well as pixels that exhibit one-to-many mappings across images. More importantly, one-to-many mappings, or disappearance of correspondences (similar to occlusion or disocclusion for stereo) can be handled as well.

Finite Motion

Now, we consider finite rotation R of the object about the camera's optical axis. Let $\{X^A_i \leftrightarrow X^B_i; i=1, \ldots, N\}$ be the set of reflection correspondences 211 on an image pair such that environment feature observed at pixel $X^A_i$ on image A matches with that at pixel $X^B_i$ on image B. This induces the following relationships on the surface gradients of the object, $$\nabla f_A(x_i^A) = \nabla f_B(x_i^B), i=1, \ldots, N \quad (5)$$

Further, $f_B(X) = f_A(R^T X)$, giving us a constraint purely in terms of the object at location A.

$$\nabla f_A(x_i^A) = R \nabla f_A(R^T x_i^B) \quad (6)$$

Given multiple images under varying (known) rotation, we can use correspondences obtained between any image pair by suitably rewriting the relationships in terms of $\nabla f_A$.

Thus, given object rotation, our idea is that the sparse reflection correspondences provide constraints on the surface gradients. To recover a dense surface, we need additional assumptions on the surface. Towards this end, we use a locally quadric model for the surface for surface reconstruction.

Shape from Sparse Correspondences

Surface Approximation Using Quadrics

We approximate a general smooth surface using local quadric models over non-overlapping patches. By smooth we mean that surface does not include sharp edges or other discontinuities. The surface $z = f(x) = f(x, y)$ is approximated as $$z = f(x, y) \approx \frac{1}{2} x^T H_i x + J_i x + \alpha_i, x \in \mathcal{N}_i, \quad (7)$$

where $H_i$, $J_i$ and $\alpha_i$ are quadric parameters defining a patch $N_i$, and T is the transpose operator. The surface gradients are $$\nabla f(x) = J_i + H_i x, x \in \mathcal{N}_i \quad (8)$$

Note that $J_i$ and $H_i$ are the surface parameters. Further, $H_i$ is a symmetric matrix, and distance from camera $\alpha_i$ is unobservable for an orthographic camera setup. The choice of the quadric model for local surface parametrization is motivated primarily from the fact that the associated surface gradient fields are affine in x. This, as we describe later, leads to linear relationships in the unknown surface parameters ($J_i$ and $H_i$) given the reflection correspondences. It is entirely possible to use alternate surface parameterizations at the cost of solving a harder inference problem. However, the quadric model serves as a good approximation for a wide range of smooth surfaces.

Reflectance Correspondences for Quadric Surface Patches

We can now reinterpret the surface gradient relationship of Equation (6) under the local quadric surface model. Equation (6) relates the surface gradients at $X^A$, and $R^T(X^B)$. Equation (6) can be rewritten in terms of the surface parameters of the patches to which the two points belong. Let $x \in N_k$, and $R^T(X^B) \in N_m$. Then, substituting the expressions for the surface gradients of Equation (8) in Equation (6), we obtain $$R(J_m + H_m R^T(x^B)) = J_k + H_k x^a \quad (9)$$

When the rotation R is known, Equation (9) is linear in the unknown surface parameters. Equation (9) also hints at a scale ambiguity in the solution space. A solution for the quadric parameters can be scaled to obtain another solution which satisfies the equations as well.

This implies that any solution to the quadric parameters at best suffers from a global scale ambiguity. However, the problem can be more severe when cliques of patches are formed, with correspondences only between neighborhoods in the same clique. A clique is a set of neighboring patches.

This could potentially lead to each clique having its own scale ambiguity, thereby leading to a far more severe problem globally. To resolve this, we enforce smoothness of the surface gradients at the boundary between two adjacent neighborhoods.

Smoothness Constraints

As described above, enforcing the reflection correspondences in Equation (9) alone can potentially lead to multiple scale ambiguities that can be very difficult to resolve. Further, the local quadric model does not necessarily lead to smooth surfaces, in that, there could be discontinuities at the boundary of the neighborhoods.

We solve both of these problems by enforcing that the gradients at the boundary of two patches to be the same on either side of the patch.

Let x be a pixel at the boundary of two neighborhoods $N_m$ and $N_n$. We can ensure that the surface gradient at x as obtained by the quadric model of $N_m$ and $N_n$ are the same.

$$J_m + H_m x = J_n + H_n x, x \in \mathcal{B}(\mathcal{N}_n) \cap \mathcal{B}(\mathcal{N}_m) \quad (10)$$

As with the relationships in Equation (9), the boundary smoothness constraint is linear in the surface parameters, and exhibits a scale ambiguity. This further reinforces the point that the global scale ambiguity cannot be resolved without absolute information of a few surface normals, or gradients. Such information can potentially be obtained from occluding contours or knowledge of normals at few distinct points. We describe show how such constraints can be incorporated into our method below.

Solving for the Surface

To solve for the surface, the patch size of the local quadric must be defined. A smaller patch allows for a better approximation of the surface, but leads to more unknowns in the surface estimation problem. Without a priori knowledge of the surface, it is not straightforward to choose neighborhoods that well approximates the surface and also reduces the number of parameters.

We chose nonoverlapping square patches over the image plane, whose size depends on the size of the problem we can solve efficiently. Given a set of reflection correspondences $\{X^A_i \leftrightarrow X^B_i\}$, and the rotation undergone by the surface R, we can now solve for the quadric surface parameters.

For each available correspondence, we formulate the relationships as given in Equation (9). Next, between the boundary of two neighborhoods, we enforce the boundary smoothness constraints of Equation (10). Stacking these, we obtain a system of linear system of equations $A\Theta = 0$, where $\Theta$ is a vector consisting of all the surface parameters $\{J_i, H_i, i = 1, \ldots, N\}$. Solution can be obtained by formulating the solution as the smallest eigenvalue of the matrix $A^T A$.

$$\hat{\Theta} = \arg\min_{\|\theta\|=1} \theta^T A^T A \theta \quad (11)$$

Alternatively, we can formulate the solution as a second order cone program (SOCP):

$$\hat{\Theta} = \arg\min_{\Theta} \|A\Theta\|_2 \text{ s.t } \underline{1}^T \Theta \geq 1 \quad (12)$$

Solving as an eigenvalue problem is often more accurate in terms of numerical precision. However, for very large systems, it is not possible to solve the eigenvalue problem due to resource constraints. In such cases, it might still be possible to solve it as a convex program. The convex formulation also allows us to incorporate additional constraints that might be available.

Using the surface parameters, we can determine 230 the gradient field 231. The surface 209 is then estimated by integrating the gradient field by solving a Poisson equation.

Additional Normal Constraints

In addition to reflection correspondences, surface normal information might be available at a sparse set of points on the surface. This information might come either from observing a known scene point, or from observing the reflection of the camera, or from the occluding contour.

In any of these cases, we can reformulate the problem such that this additional information is seamlessly integrated into our reconstruction method. The convex optimization framework for estimating the shape of the mirror-like surface is more flexible in its ability to incorporate additional constraints.

One such constraint is the knowledge of surface normals, or gradients at a few locations on the surface. Given a set of such surface gradients $$\{x_l^n, \nabla f^n(x_l), l=1, \ldots, Q_n\},$$

we can enforce these by adding constraints to the optimization problem. Each of the known gradients induce a linear constraint on the quadric parameters $$J_{n_l} + H_{n_l} x_l^n = \nabla f^n(x_l), \in \mathcal{N}_{n_l}, l=1, \ldots, Q_n. \quad (13)$$

We can now solve 220 an optimization problem defined as $$\min_{J_k, H_k} \|A\Theta\|_2 \quad (14)$$

$$s.t \underline{1}^T \Theta \geq 1$$

$$J_{n_l} + H_{n_l} x_l^n = \nabla f^n(x_l), x_l^n \in \mathcal{N}_{n_l}, l=1, \ldots, Q_n.$$

The basic nature of the optimization problem does not change, in that, it remains a SOCP. In practice, the ability to incorporate such additional information to estimate the surface of the mirror is extremely useful especially when there are not sufficient reflection correspondences to reconstruct the surface reliably. Having a few known surface gradients/normals goes a long way in regularizing the surface estimate.

EFFECT OF THE INVENTION

Sparsity of Correspondences: All of the information of the surface shape in our estimation comes from reflection correspondences. It is noteworthy that, in the absence of RC, the matrix A in Equation (11) has a 5-dimensional null space that spans the space of quadric equations. The constraints generated by the RC shift the solution from a global quadric to the surface we are interested in. In this sense, the density of reflection correspondences determines the granularity with which features on the surface are resolved. In particular, capturing fine nuances in the surface require RC that captures the subtle variations in the shape.

Complexity of Mirror Surface: The complexity of the mirror shape affects the reconstruction process in two ways. As the surface complexity increases, the size of the neighborhoods over which the quadric assumptions are made needs to be decreased. Complex surfaces affect the method in an indirect way by introducing points of parabolic curvature. As described above, under finite motion, features appear and disappear in regions close to parabolic curvature. As a consequence, there is a possibility of obtaining no SIFT features in these regions.

Our surface reconstruction uses reflection correspondences for specular surface reconstruction. Our RC avoids practical difficulties with previous SFSF methods. The modeling of the mirror surface as a locally quadric equation makes the relationship between the RC and surface linear. This allows us to reconstruct the surface using an efficient method.

In summary, we formulate the problem of recovering surface shape from reflection correspondences for the case of finite motion under un-calibrated environment. We model the surface as a locally quadric leading to a linear formulation solvable using efficient methods. We avoid practical issues in SFSF requiring only sparse reflection correspondences, leading to a practical workable solution. And finally, we describe how to incorporate auxiliary information, such as sparse surface normals to improve the reconstruction.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for reconstructing a surface of an object, wherein the object has a surface that is specular, comprising the steps of:
    applying a point correspondence procedure to a set of images of the object to produce sparse reflection correspondences, wherein the set of images is subject to rotation while acquired by a camera;
    solving a linear system $A\Theta=0$, where $\Theta$ is a vector of surface parameters, wherein the surface parameters are local and quadric;
    determining gradients of the surface from the surface parameters; and
    integrating the gradients to normals, wherein the normals define a shape of the surface, and wherein the applying, solving and integrating steps are performed in a processor.

2. The method of claim 1, wherein the camera is fixed and uncalibrated.

3. The method of claim 1, wherein a number of the sparse reflection correspondences is about two orders of magnitude less than a number of available dense reflection correspondences.

4. The method of claim 1, wherein the point correspondence procedure uses a scale-invariant feature transform (SIFT).

5. The method of claim 1, wherein the point correspondence procedure uses an optical flow.

6. The method of claim 5, wherein the optical flow is subject to infinitesimal object rotation.

7. The method of claim 1, wherein the point correspondence procedure uses a normalized correlation.

8. The method of claim 1, wherein the point correspondence procedure uses Speeded Up Robust Features (SURF).

9. The method of claim 1, wherein the surface parameters are $\{J_i, H_i, i=1, \ldots, N\}$ to define a patch of N adjacent pixels, where $J_i$ and $H_i$ are the quadric surface parameters of the $i^{th}$ patch, and $H_i$ is a symmetric matrix, and $\alpha_I$ is a distance to the camera.

10. The method of claim 1, wherein the camera is orthographic.

11. The method of claim 1, wherein the camera is a calibrated and perspective.

12. The method of claim 1, wherein the determining solves partial differential equations.

13. The method of claim 1, wherein the surface is locally smooth.

14. The method of claim 1, wherein the surface parameters are solved by using an eigenvalue solver.

15. The method of claim 1, wherein the surface parameters are solved by using a second order cone program.

16. The method of claim 1, wherein boundary smoothness constraints are enforced while solving for the surface parameters.

17. The method of claim 1, wherein the integrating solves a Poisson equation.

18. The method of claim 1, wherein surface constraints are enforced while solving for the surface parameters.

19. The method of claim 1, wherein surface gradients are enforced while solving for the surface parameters.

* * * * *